United States Patent [19]

Suenaga et al.

[11] Patent Number: 5,210,732
[45] Date of Patent: May 11, 1993

[54] OPTICAL DISK APPARATUS

[75] Inventors: Kiyoyuki Suenaga, Kasuga; Hiroyuki Gondo, Chikushino; Makoto Taromaru, Fukuoka; Koji Muraoka; Shingo Sagata, both of Kasuga, all of Japan

[73] Assignee: Matsushita Electric Industrial Co., Ltd., Osaka, Japan

[21] Appl. No.: 790,842

[22] Filed: Nov. 12, 1991

[30] Foreign Application Priority Data

Nov. 27, 1990 [JP] Japan ................................. 2-328619
Apr. 4, 1991 [JP] Japan ................................. 3-71506

[51] Int. Cl.$^5$ ............................................. G11B 7/00
[52] U.S. Cl. .............................. 369/44.29; 369/44.35; 369/44.28; 369/44.36
[58] Field of Search ............... 369/44.29, 44.28, 44.25, 369/44.27, 44.34, 44.35, 44.36, 43, 32, 47, 116, 112, 44.23, 44.32

[56] References Cited

U.S. PATENT DOCUMENTS

| | | | |
|---|---|---|---|
| 4,688,201 | 8/1987 | Towner et al. | 369/112 |
| 4,761,774 | 8/1988 | Ishibashi et al. | 369/112 |
| 4,775,966 | 10/1988 | Miura et al. | 369/44.28 |
| 4,866,688 | 9/1989 | Ohtake et al. | 369/44.28 |
| 4,878,211 | 10/1989 | Suzuki et al. | 369/44.35 |
| 4,975,895 | 12/1990 | Yanagi | 369/44.29 |
| 5,014,256 | 5/1991 | Horie et al. | 369/44.35 |

FOREIGN PATENT DOCUMENTS 60-229242 11/1985 Japan.

Primary Examiner—Aristotelis Psitos
Assistant Examiner—Muhammed Edun
Attorney, Agent, or Firm—Lowe, Price, LeBlanc & Becker

[57] ABSTRACT

An optical disk apparatus equipped with an objective lens for converging light from a light source onto a track formed on an optical disk, the objective lens being arranged to be movable and an error detecting section for detecting a difference in position between the light converged by the objective lens and the track on the optical disk. Included in the servo section of the optical disk apparatus are an amplifier for amplifying an output of the error detecting section with an amplification factor which is variable and a filter circuit for cutting off a frequency component of an output of the amplifying means, the cutoff frequency being variable. On the basis of the output of the filter circuit, a moving device moves the objective lens so that the difference between the converged light and said track is reduced. The amplification factor of the amplifier and the cutoff frequency of the filter circuit are determined in correspondence with the position of the objective lens. These amplification factor and cutoff frequency are prestored in a memory so that the corresponding amplification factor and cutoff frequency are read out therefrom in accordance with the current position of the objective lens.

26 Claims, 9 Drawing Sheets

OPTICAL DISK APPARATUS

BACKGROUND OF THE INVENTION

The present invention relates to optical disk apparatus for allowing an adequate servo control with respect to an optical disk for recording, reproducing and erasing data.

Optical disks are generally utilized as recording media which allow recording large quantities information and repeatedly reproducing and erasing the information. The optical disk apparatus illuminates, through an objective lens, a surface of an optical disk with light emitted from a semiconductor laser or the like so as to record an information signal on a spiral track formed on the optical disk surface or reproduce the information signal recorded thereon. Generally, the optical disk surface is impossible to be constructed to be perfectly flat, and the distance between the objective lens and the optical disk surface varies in accordance with the rotation of the optical disk due to the accuracy of the attachment mechanism and the like. In addition, since the depth of focus of the light spot is slight as compared with the variation of the distance, difficulty is encountered to accurately scan the signal-recorded surface of the optical disk with the light spot to thereby perform the normal information recording and reproducing operations. Accordingly, the position difference between the disk signal-recorded surface and the focus of the light spot is generally detected as the focus error signal so as to effect the focus servo control whereby the distance between the objective lens and the signal recorded-surface is kept constant. Furthermore, it is impossible that the center of the spiral track formed on the disk surface is arranged to be perfectly coincident with the center of the rotation of the optical disk, and therefore difficulty is encountered to accurately scan the center line of the track with the light spot due to the eccentricity to perform the normal recording and reproducing operations. Accordingly, the position difference between the center line of the track and the center of the light spot is generally detected as the tracking error signal so as to perform the tracking servo control whereby the scanning is allowed such that the center of the light spot is always coincident with the center line of the track. Moreover, for the recording and reproduction of data, the light spot is required to be accessible to the target position of the track. Thus, an access mechanism is required to move the optical pickup device at a high speed in the radial directions of the optical disk. Recently, the access control is actively studied.

The optical disk apparatus is required to have a frequency response characteristic up to several kHz for performing the servo control and further to be equipped with an actuator which is movable at least in a range between the outermost circumference and inner most circumference of the optical disk for the access control. Generally, a two-stage servo system is taken where a coil actuator or the like is used for the delicate movement and a linear motor or the like is used for the rough movement. However, as will be described hereinafter, the arrangement of such a conventional two-stage servo system can provide various problems such as the requirement of an actuator with a large stroke length and the difficulty of an adequate tracking control.

SUMMARY OF THE INVENTION

It is therefore an object of the present invention to provide an optical disk apparatus which is capable of stably and adequately performing the tracking control.

According to the present invention, there is provided an optical disk apparatus equipped with an objective lens for converging light from a light source onto a track formed on an optical disk, the objective lens being arranged to be movable and an error detecting section for detecting a difference in position between the light converged by the objective lens and the track on the optical disk. Included in the servo section of the optical disk apparatus are an amplifier for amplifying an output of the error detecting section with an amplification factor which is variable and a filter circuit for cutting off a frequency component of an output of the amplifying means, the cutoff frequency being variable. On the basis of the output of the filter circuit, a moving device moves the objective lens so that the difference between the converged light and said track is reduced. The amplification factor of the amplifier and the cutoff frequency of the filter circuit are determined in correspondence with the position of the objective lens. These amplification factor and cutoff frequency are prestored in a memory so that the corresponding amplification factor and cutoff frequency are read out therefrom in accordance with the current position of the objective lens.

Further, an optical disk apparatus according to this invention includes offset superimposing means for superimposing an offset value on an output of the error detecting means, the offset value being prestored in the memory so as to be variable in accordance with the position of the objective lens. For the servo control, the prestored offset value is read out from the memory in accordance with the position of the objective lens so as to be superimposed on the output of the error detecting means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Prior to describing an embodiment of the present invention, a brief description will be made hereinbelow in terms of the above-mentioned conventional two-stage servo system for a better understanding of this invention.

Figure 1:
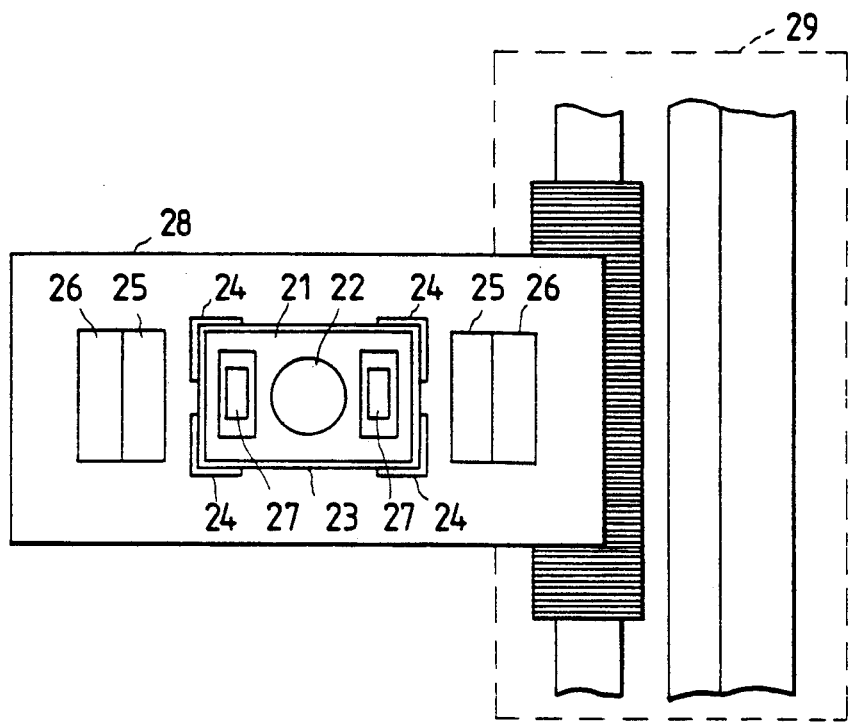
FIG. 1 shows an arrangement of a prior art optical pickup device.

FIG. 1 is an illustration of an arrangement of an optical head section of the conventional two-stage servo system. In FIG. 1, to an objective lens holder 21 which is a moving section of an optical pickup device, there are attached an objective lens 22, a focus coil 23 and a tracking coil 24, and the objective lens holder 21 is attached through an elastic member to an optical pickup fixing section (not shown) so as to be movable in the tracking and focusing directions. The focus coil 23 and the tracking coil 24 attached to the objective lens holder 21 are disposed within a magnetic circuit comprising magnets 25, outer yokes 26 and inner yokes 27.

In response to supply of a current to the focus coil 23, an electromagnetic force generates in the focus directions so as to vertically move the objective lens holder 21 which holds the objective lens 22. On the other hand, in response to supply of a current to the tracking coil 24, an electromagnetic force generates in the tracking directions so as to horizontally move the objective lens holder 21, i.e., the objective lens 22. The displacement of the objective lens 22 in the tracking directions is arranged to be detectable by a sensor. The optical pickup device comprising the moving section and the stationary section is fixed to a carriage 28 which is movable by means of a linear motor 29 in the tracking directions.

Figure 2:
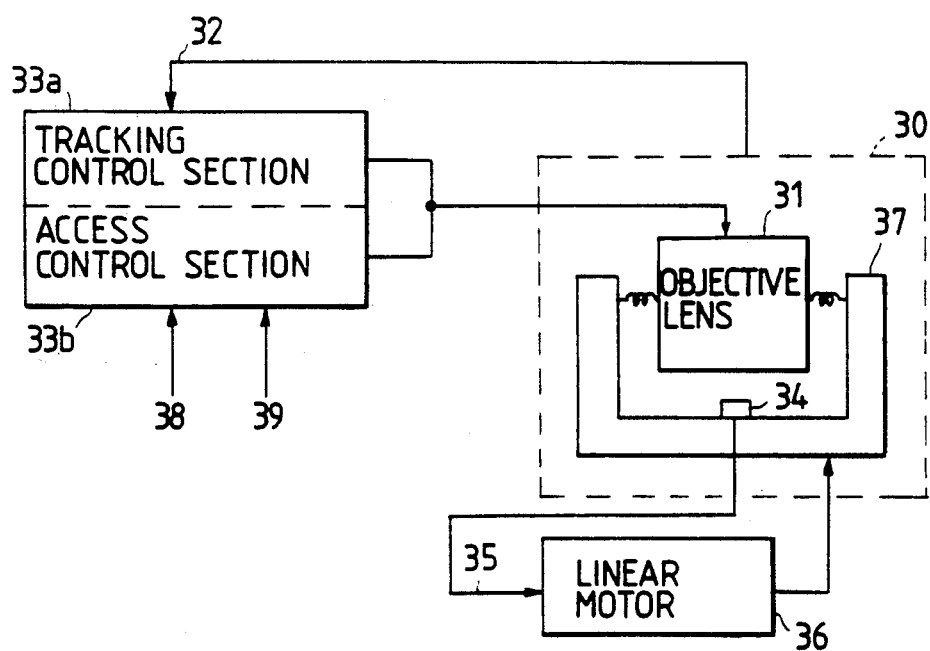
FIG. 2 is a block diagram showing an arrangement of a conventional optical disk apparatus.

FIG. 2 is a block diagram for describing the operation of the two-stage servo system. In FIG. 2, first, at the time of the tracking operation, a tracking error signal 32 outputted from an optical pickup device 30 is inputted to a tracking control section 33a so that an objective lens 31 of the optical pickup device 30 is position-controlled in the tracking directions. At this time, the displacement of the objective lens 31 is detected by an objective lens displacement sensor 34 and an objective lens displacement signal 35 due to the detection is inputted to a linear motor 36 whereby the optical pickup device 30 moves cause the objective lens displacement signal 35 to reach zero. Secondly, at the time of the access operation, on the basis of a target track signal 38 and a current track position signal 39, an access control section 33b performs the position control of the objective lens 31 of the optical pickup device 30 in the tracking directions. Also at the time of the access operation, as well as the tracking operation, the objective lens displacement signal 35 outputted from the objective lens displacement sensor 34 is inputted to the linear motor 36 so that the objective lens displacement signal 35 becomes zero.

However, according to the above-described prior art arrangement, when performing both the tracking control and access control by means of a single actuator, the actuator is required to have a long stroke length and a wide response frequency band. In addition, although there is no problem if the characteristic of the actuator is uniform in the entire movable range of the objective lens, when the stroke length becomes long, the characteristic of the actuator varies in accordance with the position of the objective lens due to the friction between the moving section and stationary section of the actuator and others, whereby difficulty is encountered to accurately perform the tracking control and further adequate drive conditions for the tracking and accessing operations becomes different from each other. Moreover, an offset occurs due to an external force affected from the flexible printed circuit for the wiring to the coil to the pickup device whereby there is the possibility that the follow-up accuracy of the tracking servo is deteriorated.

Figure 3:
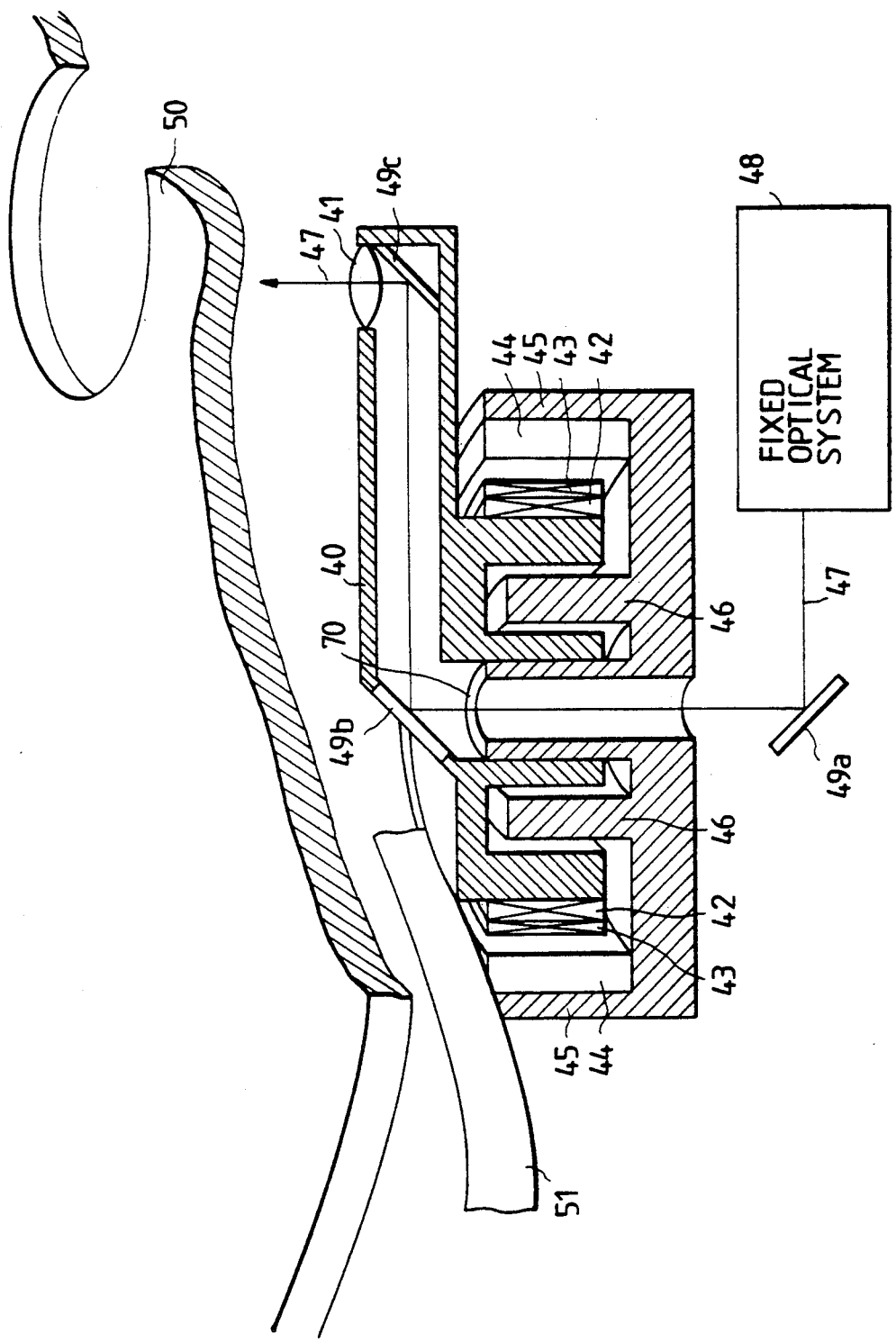
FIG. 3 is an illustration of an optical head section to be used in the present invention.

Referring now to FIG. 3, there is illustrated an arrangement of an optical head section (swing-arm type optical pickup device) of an optical disk apparatus to be used in the present invention. In response to reduction of the diameter of the optical disk, both the tracking operation and access operation may be effected by means of a single actuator in view of size-reduction and speed-up. In FIG. 3, to an objective lens holder 40 which is a movable section there are attached an objective lens 41, a focus coil 42, a tracking coil 43 and a flexible printed circuit board 51. The objective lens holder 40 is arranged to be rotatable about a shaft 70 provided in an optical pickup fixing section (not shown) and further movable or slidable along the axis of the same shaft 70. The focus coil 42 and the tracking coil 43 are respectively positioned within a magnetic circuit due to a magnet 44, an outer yoke 45 and an inner yoke 46. First, in response to supply of a current to the focus coil 42, an electromagnetic force generates in the focusing direction so that the objective lens holder 40 which holds the objective lens 41 vertically moves. On the other hand, in response to supply of a current to the tracking coil 43, an electromagnetic force horizontally generates whereby the objective lens 41 rotates about the shaft 70. A light beam 47 emitted from a fixed optical system 48 is reflected by reflection mirrors 49a to 49c so as to be led through the objective lens 41 to an optical disk 50. This system can simplify the structure of the optical pickup device to allow size-reduction and weight-reduction and, in addition, permits the size-reduction of the drive apparatus concurrently with speed-up of the access as compared with the system in which the optical pickup device is placed on a carriage so as to be driven by a linear motor or the like.

Figure 4A:
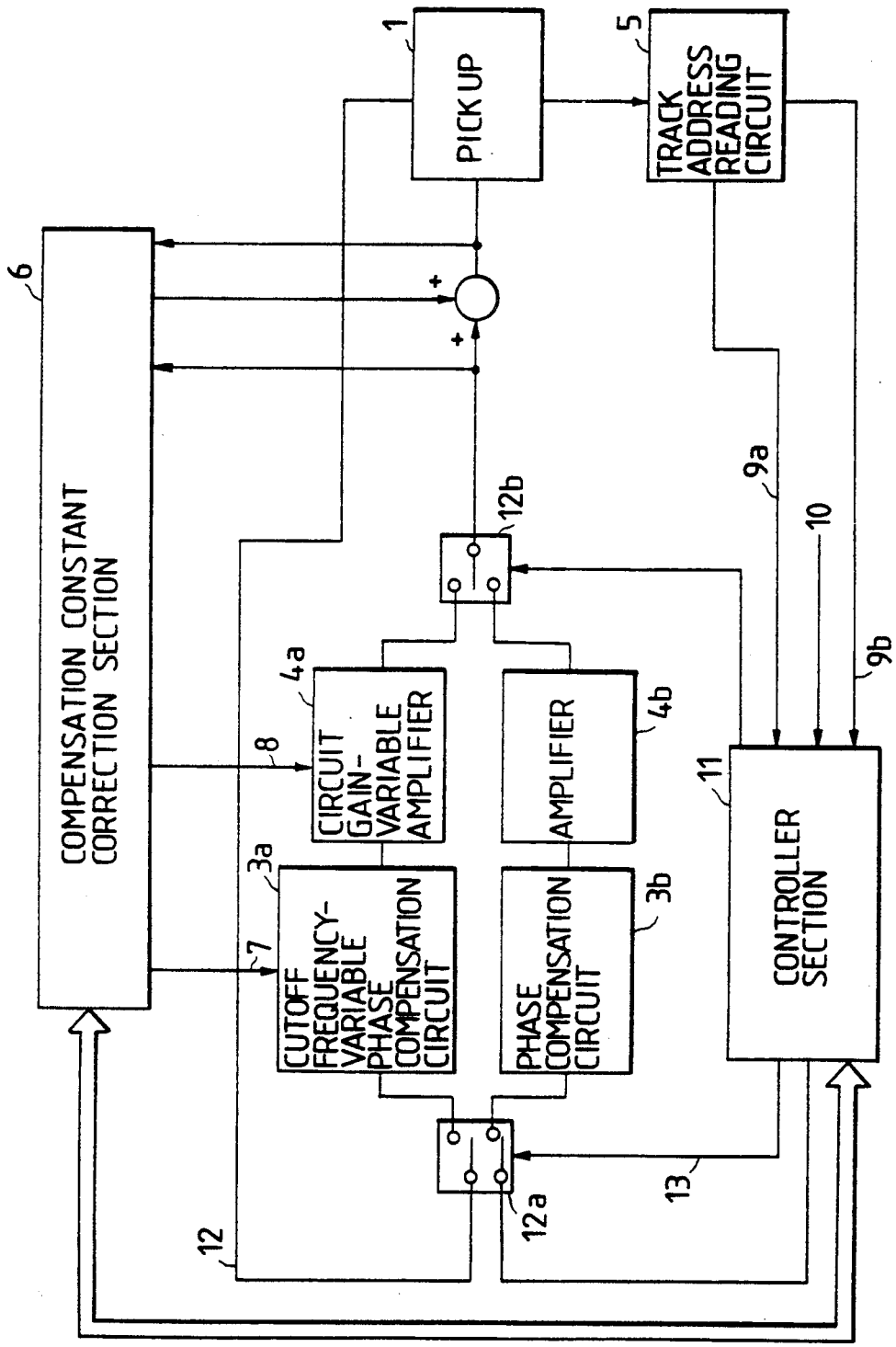
FIG. 4A is a block diagram showing an arrangement of an optical disk apparatus according to a first embodiment of the present invention.
Figure 4B:
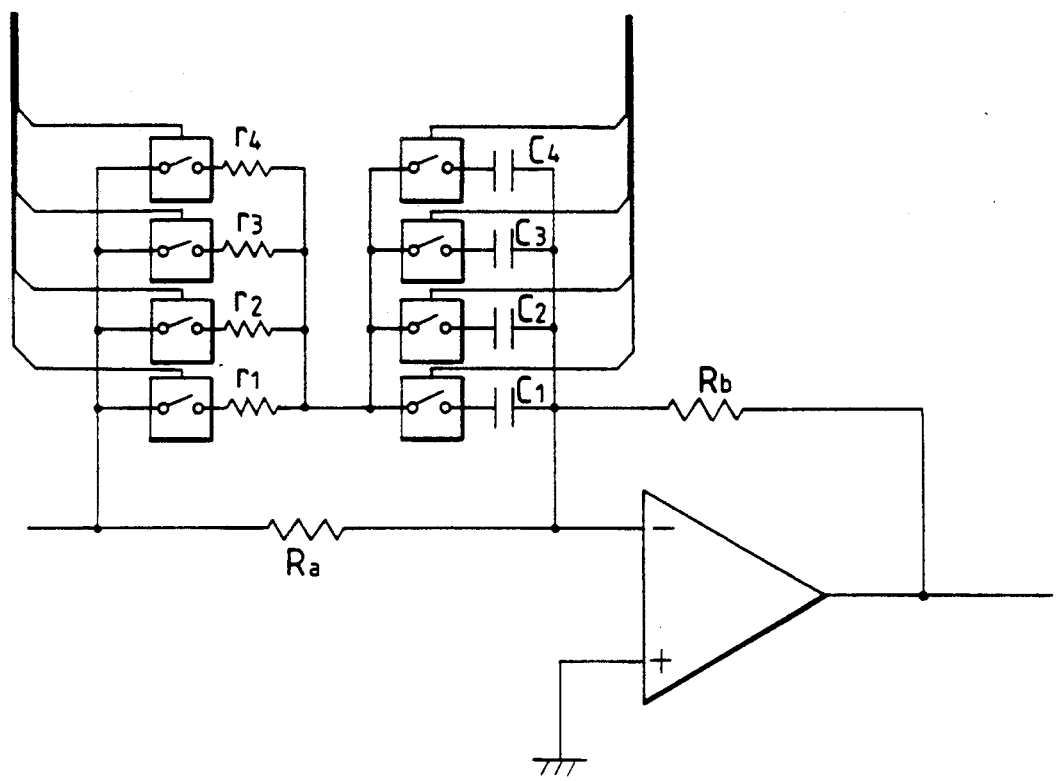
FIG. 4B is an illustration of one example of a circuit arrangement of a cutoff frequency-variable phase compensation circuit used in FIG. 4A.

FIG. 4A i a block diagram showing an arrangement of an optical disk apparatus according to a first embodiment of this invention into which the above-described optical pickup device is incorporated. First, at the time of the tracking operation, a tracking error signal 2 produced by an optical pickup device 1 is inputted to a phase compensation circuit 3a whose cutoff frequency is arranged to be variable and further to an amplifier 4a whose circuit gain is arranged to be variable, whereby an objective lens of the optical pickup device 1 is controllable in position on the basis of the outputs thereof. At this time, in accordance with a signal 9a indicative of the position of the objective lens detected by a track address reading circuit 5, a compensation constant correction section 6 outputs a phase compensation correction signal 7 and a circuit gain correction signal 8 so as to change the cutoff frequency of the cutoff frequency-variable phase compensation circuit 3a and the circuit gain of the circuit gain-variable amplifier 4a in accordance with the position of the objective lens. This compensation constant correction section 6 is equipped with a means for storing a correction value with respect to the position of the objective lens, and at the time of the turning-on of a power supply, this correction value is obtained by a correction value detecting means of the compensation constant correction section 6 and the stored therein. FIG. 4B shows one example of an circuit arrangement of the phase compensation circuit 3a.

Secondly, at the time of the access operation, a controller section 11 produces an acceleration and deceleration signal 13 on the basis of a present track address signal 9a read out from the disk and a target track address signal 10 for the access operation supplied from a central processing unit for wholly controlling the optical disk apparatus. Further, the controller section 11 performs the switching operations of switches 12a and 12b to that the acceleration and deceleration signal 13 produced by the controller section 11 is applied through the phase compensation circuit 3b and the amplifier 4a to the optical pickup device 1 so as to effect the position control of the objective lens.

Figure 5:
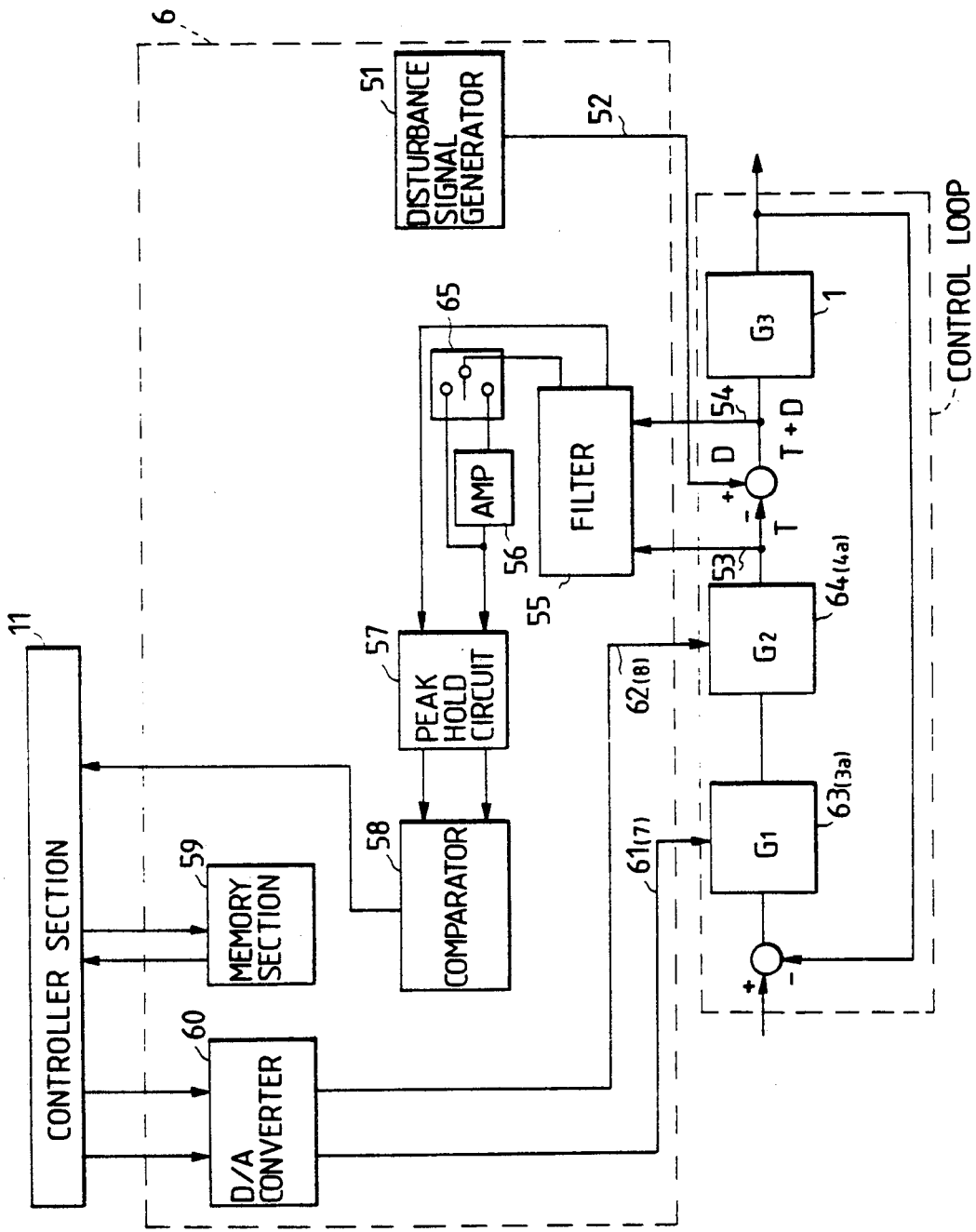
FIG. 5 is a block diagram showing an arrangement of a compensation constant correction section to be used in the FIG. 4A optical disk apparatus.

A description will be made hereinbelow with reference to FIG. 5 in terms of the above-mentioned compensation constant correction section 6. In FIG. 5, immediately after the turning-on of the power supply for the optical disk apparatus, the compensation constant correction section 6 measures the direct-current gain of the control loop (comprising the cutoff frequency-variable phase compensation circuit 3a, circuit gain-variable amplifier 4a, and the optical pickup device 1 in FIG. 4A) and the alternate-current gain of the control loop at the gain intersection frequency, which is the upper limit frequency of the servo band of the optical pickup device 1 determined in advance, at several predetermined points in the tracking directions of the objective lens. When the gain of a cutoff-frequency-variable filter circuit 63 (corresponding to the cutoff frequency-variable phase compensation circuit 3a in FIG. 4A) is taken to be G1, the gain of an amplification factor-variable amplifier 64 (corresponding to the circuit gain-variable amplifier 4a in FIG. 4A) is taken as G2 and the gain of the optical pickup device 1 is G3, the control loop gain G1·G2·G3 can be obtained as follows:

$$G1 \cdot G2 \cdot G3 = -T/(T+D)$$

where D represents a disturbance signal to be applied from a disturbance signal generator 51 in obtaining the control loop gain, T designates immediately before the signal application, and T+D denotes a signal immediately after the signal application.

A description will be made hereinbelow in terms of a method of obtaining the control loop gain G1·G2·G3. First, at a predetermined position of the objective lens of the optical pickup device 1 in the tracking directions, an disturbance signal 52 is applied from the disturbance signal generator 51 into the control loop. Signals 53 and 54 immediately before and after the signal-applied point are supplied to a filter 55 to remove noises. After passed through the filter 55, the signal 54 immediately after the signal-applied point is supplied through a switch 65 to an amplifier 56 having the same gain as the loop gain required for the control loop for the control of the optical pickup device 1 and then supplied to a peak hold circuit 57. On the other hand, the signal 53 immediately before the signal-applied point is directly lead to the peak hold circuit 57. The peak hold circuit 57 detects the peaks of the inputted signals 53 and 54 and the detected peaks thereof are supplied to a comparator 58 so as to perform the comparison therebetween, the comparison result being supplied to the controller section 11. The controller section 11 switches the amplification factor, stored in a memory section 59, so that the output values of the peak hold circuit 57 substantially become equal to each other, and generates the information indicative of this amplification factor so as to be inputted through a digital-to-analog (D/A) converter 60 to the amplification factor-variable amplifier 64 as an amplification factor correction signal 62 whereby the amplification factor of the amplifier 64 is changed in accordance with the amplification factor correction signal 62.

Secondly, for obtaining the alternate-current gain, the disturbance signal generator 51 applies a signal 52 having the same as the gain intersection frequency into the control loop. In response to the application of the signal 52, signals 53 and 54 immediately before and after the signal-applied point are respectively picked up and supplied to the filter 55 so as to remove noises therefrom. After passed through the filter 55, the signals 53 and 54 are respectively supplied to the peak hold circuit 57 so as to detect the peaks thereof which are in turn inputted to the comparator 58. The controller section 11 switches the cutoff frequency, stored in the memory section 59, so that the outputs of the peak hold circuit 57 substantially become equal to each other, and generates the information indicative of the switched cutoff frequency so as to be inputted through the D/A converter 60 to the cutoff frequency-variable filter circuit 63 as a cutoff frequency correction signal 61 whereby the cutoff frequency of the filter circuit 63 is changed in accordance with the cutoff frequency correction signal 61.

The amplification factor and cutoff frequency thus obtained, together with the objective lens position signal 9a, are stored in the memory 59, whereby, during the tracking operation, the cutoff frequency of the cutoff frequency-variable phase compensation circuit 7 and the amplification factor of the circuit gain-variable filter circuit 4a are switch-controllable on the basis of the information stored in the memory section 59.

Figure 6:
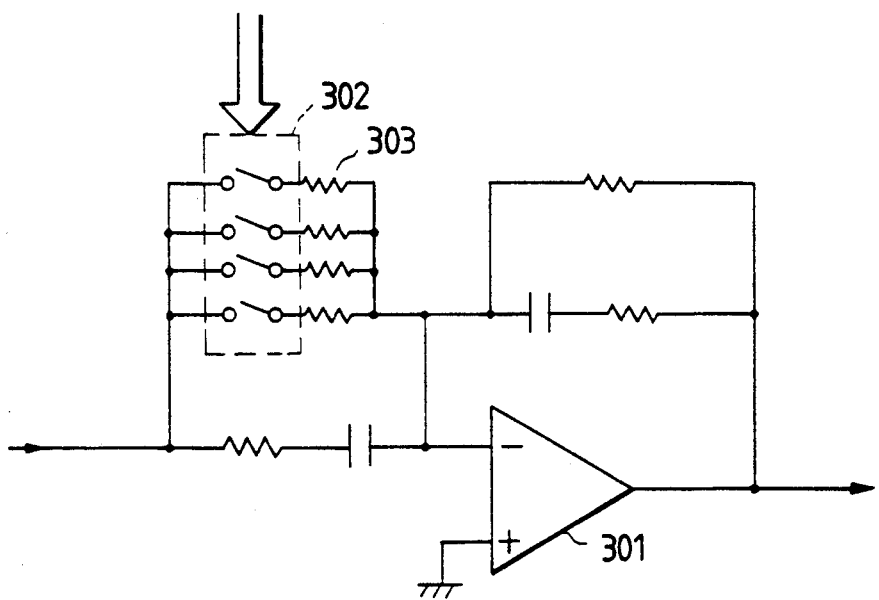
FIG. 6 illustrates one example of arrangements of a cutoff frequency-variable filter circuit and an amplification factor-variable amplifier to be used in the first embodiment of this invention.

Here, although in the above described embodiment the cutoff frequency-variable filter circuit 63 and the amplification factor-variable amplifier 64 are of the analog signal control types comprising operational amplifiers, it is appropriate that they are of the digital control types comprising multiplexers as illustrated in FIG. 6. That is, the amplification factor or the like is controlled with a combination of a resistance element of the filter circuit comprising an operational amplifier 301, a digital control type switching means such as an analog switching means 302 and resistors 303. In this case, the D/A converter 60 is not required, and the amplification factor or cutoff frequency is set to a predetermined value by a plurality of digital control signals from the controller section 11.

According to this embodiment, at least one of the amplification factor and filter cutoff frequency is arranged to be changeable at the times of the tracking operation and access operation, and therefore adequate drive conditions can be set for both the tracking and access operations.

Further, a description will be made hereinbelow in terms of a second embodiment of this invention. The second embodiment is made in consideration of the fact that, in the case that the optical pickup device is supported by an elastic member such as a flexible printed-circuit board, since the stress due to the elastic member varies in accordance with the position of the objective lens, it is required to cancel the stress at every position of the objective lens.

Figure 7:
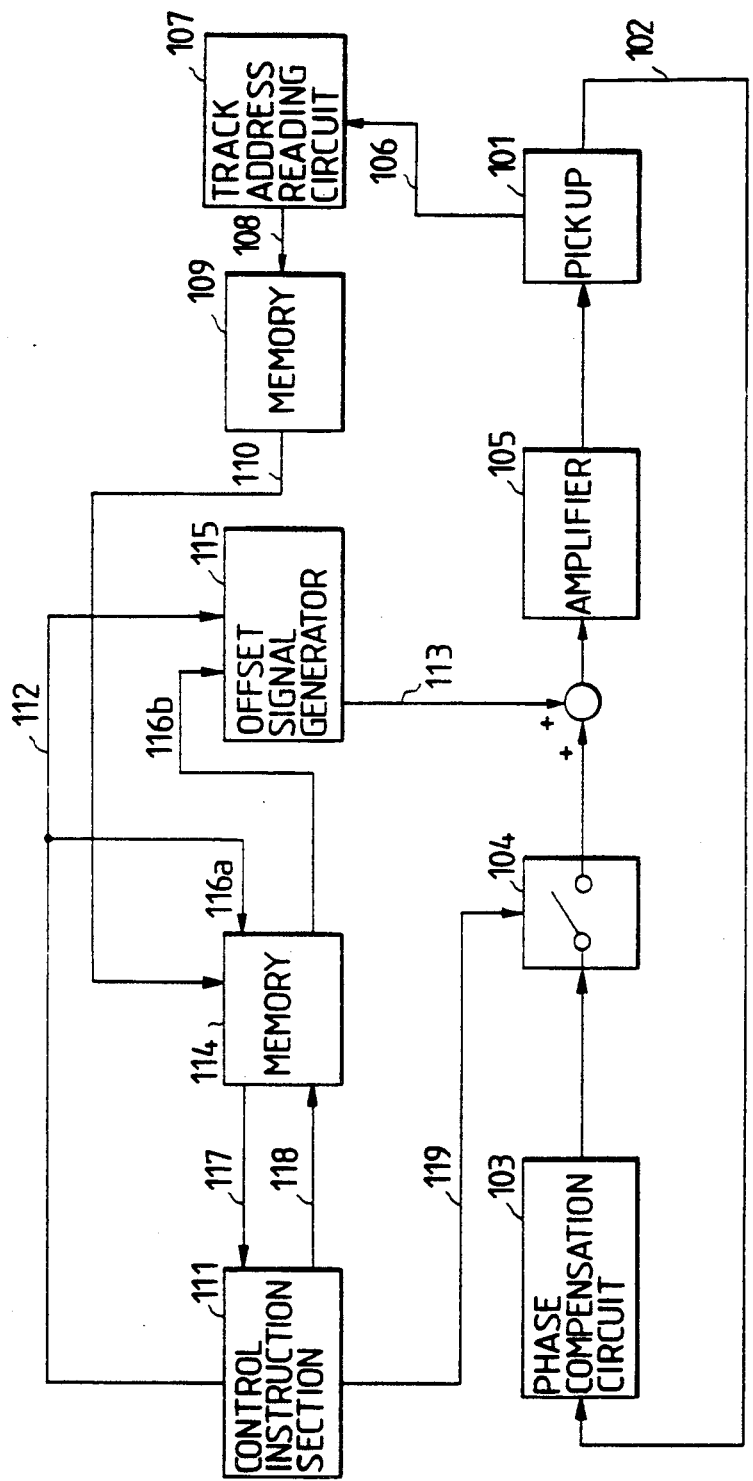
FIG. 7 is a block diagram showing an arrangement of an optical disk apparatus according to a second embodiment of this invention.

FIG. 7 is a block diagram showing an arrangement of a principal portion of the second embodiment. In FIG. 7, immediately after the turning-on of the power supply of the drive apparatus, a control instruction section 111 comprising a microcomputer or the like generates one switch control signal 119 so as to cause a switch 104 to take the closed state so that the tracking servo loop is in the opening state. First, in response to start of the focus operation, the control instruction section 111 outputs an instruction signal 112 indicative of a movement instruction value to an offset signal generating circuit 115, comprising a D/A converter or the like, which in turn generates an offset signal 113 in response to the input of the instruction signal 112. The offset signal 113 is applied into the tracking servo loop to supply a current to the tracking coil, thereby moving an optical pickup device 101. Secondly, the control instruction section 111 generates a different switching control signal 119 so as to cause the switch 104 to enter into the closed state to turn on the tracking servo and input a reproduction signal 106 from the disk to a track address reading circuit 107 to read out a track address 108. A memory 109 designated at numeral 109 is a memory outputs, on the basis of the read track address 108, an objective lens position signal 110 prestored. At this time, with respect to the objective lens position signal 110, the movement instruction signal 112 which is applied from the control instruction section 111 to the offset signal generating circuit 115 is stored as an offset correction value 116a in a memory 114. The above-described operation is performed at predetermined several points so as to sequentially detect the track address 108 to store the offset correction value 116a with respect to the objective lens position signal 110. In terms of the non-measured objective lens position, the calculation process is made on the offset values 117 corresponding to the one or more actually-measured objective lens positions in the control instruction section 111 and approximately obtained offset correction values 118 are stored, whereby the offset signals to be corrected with respect to the positions of the objective lens are stored in the entire movable range of the objective lens.

Furthermore, at the time of the signal recording, reproducing or erasing operation, the switch 104 is closed by the switching control signal 119, and a tracking error signal 102 produced by the optical pickup device 101 is led to a phase compensation circuit 103 and further led through the switch 104 to an amplifier 105 the output of which is used for the position control of the objective lens. In accordance with the objective lens position signal 110, the offset correction value 116b stored in advance in the memory 114 is inputted to the offset signal generating circuit 115 so that the offset signal 113 is applied into the tracking servo loop.

Figure 8:
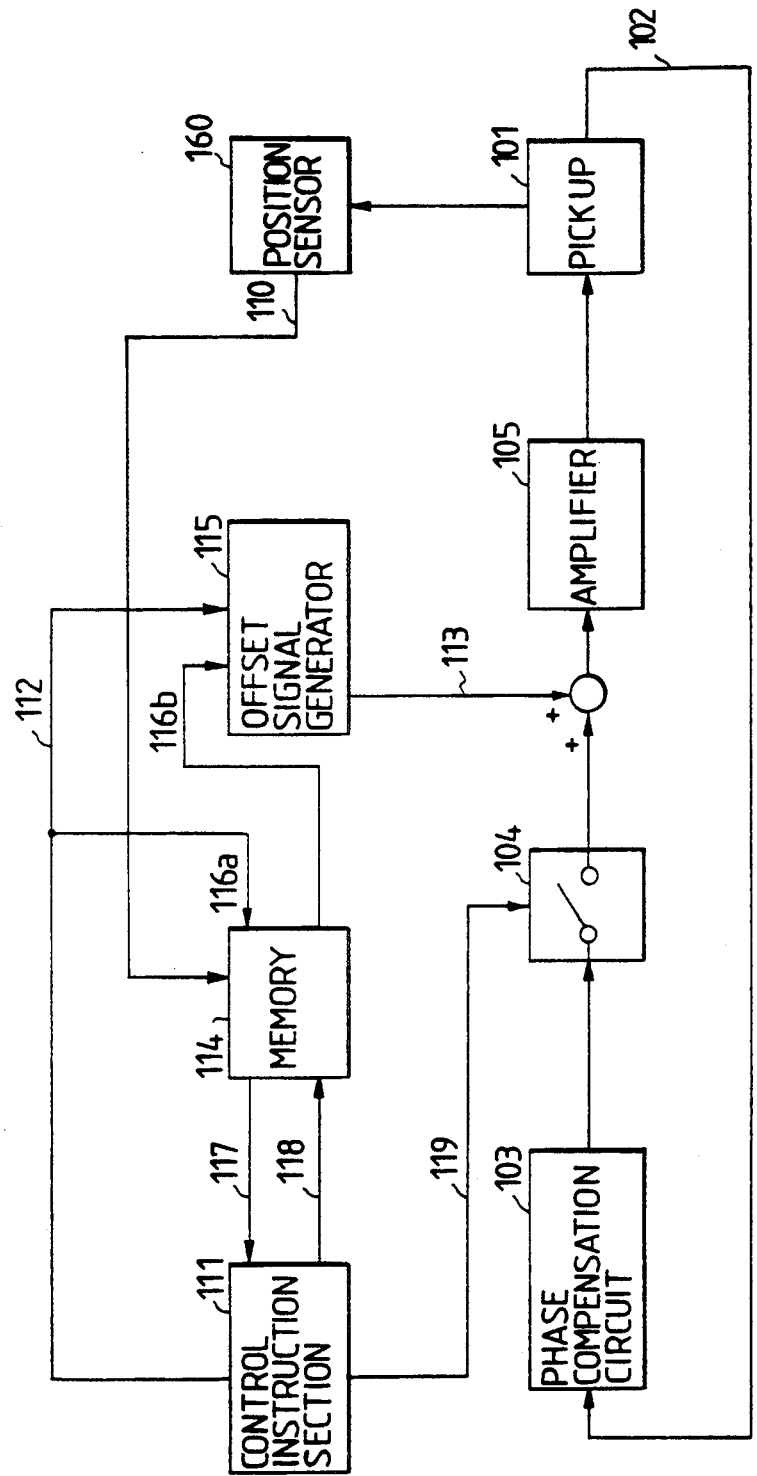
FIG. 8 is a block diagram showing an arrangement of an optical disk apparatus according to a third embodiment of this invention.

Further, a description will be made with reference to FIG. 8 in terms of a third embodiment of this invention in which parts corresponding to those in FIG. 7 will be designated with the same marks. One difference between the above-described second embodiment and this third embodiment is that a position sensor (160) is used as the objective lens position detecting means without performing the track address detection. According to the third embodiment, the memory 109 in the second embodiment can be omitted because the object lens position signal 110 can be directly obtained. In FIG. 8, immediately after the turning-on of the power supply of the drive apparatus, a switch 104 takes the opening state due to a switch control signal 119 outputted from a control instruction section 111 so that the tracking servo loop is in the opening state. Subsequently to start of the focus servo, the control instruction section 111 generates a signal 112 indicative of a movement instruction value whereby an offset signal generating circuit 115 comprising a D/A converter or the like generates an offset signal 113. This offset signal 113 is applied to the tracking servo loop so as to supply a current to the tracking coil to move an optical pickup device 101. An objective lens position sensor 160 outputs a lens position signal 110. At this time, the movement instruction value 112 corresponding to the objective lens position signal 110, which value is applied from the control instruction section 111 to the offset signal generating circuit 115, is stored as an offset correction value 116 in a memory 114. This operation is effected at predetermined several points to sequentially store the offset correction value 116a in correspondence with the objective lens position signal 110. In terms of the non-measured objective lens positions, the control instruction section 111 performs a calculation so that the offset correction values 118 are approximately obtained on the basis of the offset values 117 corresponding to the actually measured objective lens positions and then stored therein. Thus, the offset signals for the correction are stored in correspondence with the objective lens positions in the entire movable range of the objective lens.

Figure 9:
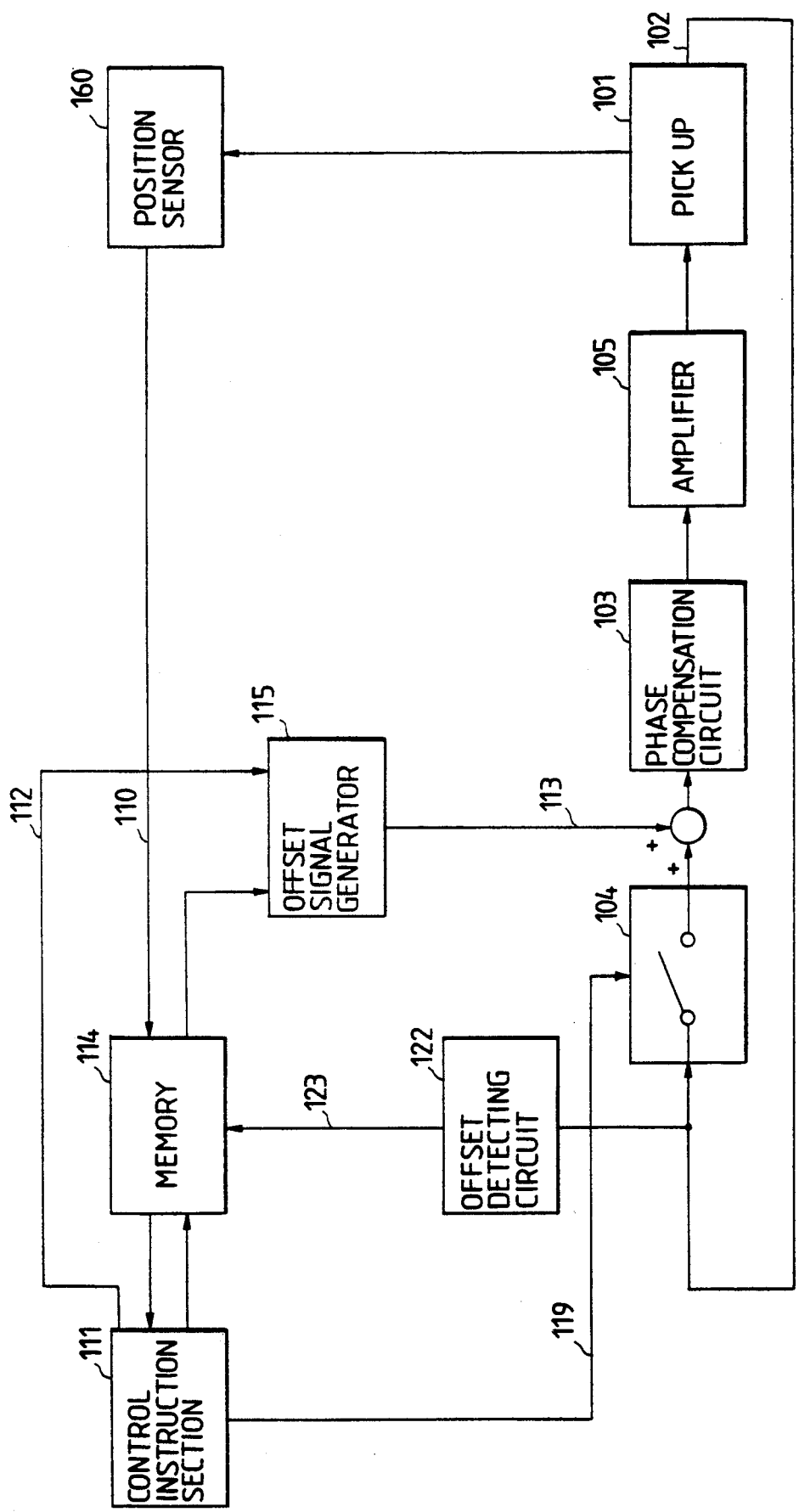
FIG. 9 is a block diagram showing an arrangement of an optical disk apparatus according to a fourth embodiment of this invention.
Figure 10:
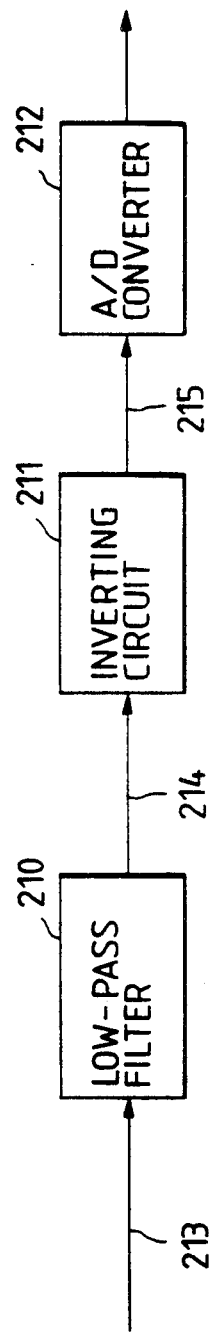
FIG. 10 is a block diagram showing an arrangement of an offset detecting circuit to be used in the fourth embodiment of this invention.
Figure 11C:
FIGS. 11A to 11C are illustrations of waveforms of signals at points in the FIG. 10 offset detecting circuit.
Figure 11B:
Figure 11A:

A fourth embodiment will be described hereinbelow with reference to FIG. 9 where parts corresponding to those in FIG. 8 are marked with the same numerals. This fourth embodiment is arranged so as to cancel the offset due to the optical system. In FIG. 9, immediately after the turning-on of the power supply of the drive apparatus, a control instruction section 111 outputs a switch control signal 119 whereby a switch 104 is in the opening state to cause the tracking servo loop to being in the opening state. Secondly, the control instruction section 111 outputs an instruction value 112 whereby an offset signal generating circuit 115 comprising a D/A converter or the like generates an offset signal 113 which is in turn applied into the tracking control loop so as to supply a current to the tracking coil to continuously move the objective lens. At this time, an offset detecting circuit 122 continuously detects offset signals 123 on the basis of the continuously generated tracking error signals (signals due to crossing channels) so that the offset signals 123 are stored in a memory section 114 in correspondence with objective lens position signals 110 which are the outputs of the objective lens position sensor 160. The offset detecting circuit 122 can be constructed as illustrated in FIG. 10. That is, from the tracking error signal 213 including a low-frequency offset at the time of crossing the disk as illustrated in FIG. 11A, only the offset component is extracted in a low-pass filter 210 so as to obtain a signal 214 as illustrated in FIG. 11B and then inverted in an inverting circuit 211 so as to obtain a cancelling signal 215 as illustrated in FIG. 11C. This cancelling signal 215 is digitalized by an A/D converter 212 and then stored in the memory 114. Thus, the offset signals with respect to the objective lens positions are stored in the entire movable range of the objective lens.

For recording, reproducing and erasing the information signal, the switch 104 is closed by the switch control signal 119 and the tracking error signal 102 produced by the optical pickup device 102 is supplied to a phase compensation circuit 103 and further to an amplifier 104 for performing the position control of the objective lens. In accordance with the objective lens position signal 110, the offset signal 123 prestored in the memory section 114 is inputted to the offset signal generating circuit 115, and an offset cancelling signal 113 having the polarity opposite to the polarity of the offset signal 123 stored in the memory section 114 is applied to the tracking servo loop.

According to this invention, the above-described arrangement can cancel the offset to be generated due to the optical factor and the external force applied from the elastic member or the like to the optical pickup device. With the adequate drive conditions for the tracking and access operations being obtained in accordance with the distance of the objective lens from the rotational center of the optical pickup disk, the tracking control can stably effected irrespective of the fact that the characteristic of the optical pickup device varies in accordance with the distance of the objective lens from the rotational center of the optical disk.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A track servo control system for an optical disk apparatus, comprising:
   an objective lens for converging light from a light source onto a track formed on an optical disk, said objective lens being arranged to be movable;
   error detecting means for detecting a difference in position between the light converged by said objective lens and said track on said optical disk;
   amplifier means having an amplification factor for amplifying an output signal of said error detecting means, said amplifier means being arranged such that said amplification factor thereof is changeable;
   moving means for moving said objective lens on the basis of said output signal of said error detecting means, amplified by said amplifier means, so as to reduce the difference in position between the converged light and said track; and
   control means for storing amplification factors for said amplifier means which are predetermined in correspondence with distances between said objective lens and a rotational center of said optical disk so as to select one of said stored amplification factors in accordance with the distance between said objective lens and said optical disk rotational center to change said amplification factor of said amplifier means to the selected amplification factor so that the difference in position between the converged light and said track is optimally reduced.

2. A track servo control system for an optical disk apparatus as claimed in claim 1, wherein said moving means is composed of a single actuator which performs both tracking and access operations.

3. A track servo control system for an optical disk apparatus, comprising:
   an objective lens for converging light from a light source onto a track formed on an optical disk, said objective lens being arranged to be movable;
   error detecting means for detecting a difference in position between the light converged by said objective lens and said track on said optical disk;
   variable gain means arranged such that a gain for an amplification of an output signal of said error detecting means is changeable;
   moving means for moving said objective lens on the basis of the output signal of said error detecting means, amplified by said variable gain means, so as to reduce the difference in position between the converged light and said track; and
   gain control means for storing gains predetermined in correspondence with distances between said objective lens and a rotational center of said optical disk so as to select one of the stored gains in accordance with the distance between said objective lens and said optical disk rotational center to change said gain of said variable gain means so that the difference in position between said objective lens and the optical disk rotational center is optimally reduced.

4. A track servo control system for an optical disk apparatus as claimed in claim 3, wherein said moving means is composed of a single actuator which performs both tracking and access operations.

5. A track servo control system for an optical disk apparatus, comprising:
   an objective lens for converging light from a light source onto a track formed on an optical disk, said objective lens being arranged to be movable;
   error detecting means for detecting a difference in position between the light converged by said objective lens and said track on said optical disk;
   filter means having a frequency region to pass an output of said error detecting means, said frequency region of said filter means being arranged to be changeable;
   moving means for moving said objective lens in accordance with said output signal of said error detecting means passing through said filter means so that the difference in position between the converged light and said track is reduced; and
   filter control means for storing frequency regions predetermined in correspondence with distances between said objective lens and a rotational center of said optical disk, said filter control means selecting, on the basis of the distance therebetween, one of the stored frequency regions to optimally reduce the difference in position between said converged light and said track and changing said frequency region of said filter means to the selected frequency region.

6. A track servo control system for an optical disk apparatus as claimed in claim 5, wherein said moving means is composed of a single actuator which performs both tracking and access operations.

7. A track servo control system for an optical disk apparatus, comprising:
   an objective lens for converging light from a light source onto a track formed on an optical disk, said objective lens being arranged to be movable;
   error detecting means for detecting a difference in position between the light converged by said objective lens and said track on said optical disk;

offset superimposing means for superimposing an offset value on an output of said error detecting means;

moving means for moving said objective lens in accordance with said output of said error detecting means, on which said offset value is superimposed by said offset superimposing means, so that the difference in position between the converged light and said track is reduced; and offset value control means for storing offset values predetermined in correspondence with distances between said objective lens and a rotational center of said optical disk, said offset value control means selecting one of the stored offset values on the basis of the current distance between said objective lens and the optical disk rotational center to control said offset superimposing means so that said offset value to be superimposed on said output of said error detecting means is controlled to the selected offset value.

8. A track servo control system for an optical disk apparatus as claimed in claim 7, wherein said moving means is composed of a single actuator which performs both tracking and access operations.

9. A track servo control system for an optical disk apparatus, comprising:

an objective lens for converging light from a light source onto a track formed on an optical disk, said objective lens being arranged to be movable;

error detecting means for detecting a difference in position between the light converged by said objective lens and said track on said optical disk;

variable gain means arranged such that a gain for an amplification of an output signal of said error detecting means is changeable;

filter means having a frequency region to pass said output signal of said error detecting means, said frequency region being arranged to be changeable;

moving means for moving said objective lens in accordance with said output signal of said error detecting means, which is amplified by said variable gain means and which passes through said filter means, so that the difference in position between the converged light and said track is reduced; and gain and filter control means for storing gains of said variable gain means and frequency regions of said filter means predetermined in correspondence with distances between said objective lens and a rotational center of said optical disk, said gain and filter control means selecting one of the stored gains and one of the stored frequency regions on the basis of the current distance between said objective lens and said optical disk rotational center to change said gain of said variable gain means to the selected gain and further to change said frequency region of said filter means to the selected frequency region.

10. A track servo control system for an optical disk apparatus as claimed in claim 9, wherein said moving means is composed of a single actuator which performs both tracking and access operations.

11. A track servo control system for an optical disk apparatus, comprising:

an objective lens for converging light from a light source onto a track formed on an optical disk, said objective lens being arranged to be movable;

error detecting means for detecting a difference in position between the light converged by said objective lens and said track on said optical disk;

variable gain means having a gain for amplification of an output signal of said error detecting means, said gain being arranged to be variable;

offset superimposing means for superimposing an offset value on said output signal of said error detecting means, said offset value being variable;

moving means for moving said objective lens in accordance with said output signal of said error detecting means, on which said offset value is superimposed by said offset superimposing means, so that the difference in position between the converged light and said track is reduced; and gain and offset value control means for storing gains for said variable gain means and offset values for said offset superimposing means in correspondence with distance between said objective lens and a rotational center of said optical disk, said gain and offset value control means selecting one of the stored gains and one of the stored offset values in accordance with the current distance between said objective lens and the optical disk rotational center to change said gain of said variable gain means to the selected gain and change the offset value of said offset superimposing means to the select offset value so that the difference in position between the converged light and said track is optimally reduced.

12. A track servo control system for an optical disk apparatus as claimed in claim 11, wherein said moving means is composed of a single actuator which performs both tracking and access operations.

13. A track servo control system for an optical disk apparatus, comprising:

an objective lens for converging light from a light source onto a track formed on an optical disk, said objective lens being arranged to be movable;

error detecting means for detecting a difference in position between the light converged by said objective lens and said track on said optical disk;

variable gain means having a gain for amplification of an output signal of said error detecting means, said gain being variable;

filter means having a frequency region to pass said output signal of said error detecting means, said frequency region being variable;

offset superimposing means for superimposing an offset value on said output signal of said error detecting means, said offset value being variable;

moving means for moving said objective lens in accordance with said output signal of said error detecting means, which is amplified by said variable gain means, which passes through said filter means and on which said offset value is superimposed by said offset superimposing means, so that the difference in position between the converged light and said track is reduced; and control means for storing gains for said variable gain means, offset values for said offset superimposing means, frequency regions for said filter means in correspondence with distances between said objective lens and a rotational center of said optical disk, said control means selecting one of the stored gains, one of the stored offset values and one of the stored frequency regions in accordance with the current distance between said objective lens and said optical disk rotational center to change said gain of said variable gain means, said offset value of said offset superimposing means and said frequency region of said filter means to the selected gain, offset value and frequency region.

14. A track servo control system for an optical disk apparatus as claimed in claim 13, wherein said moving means is composed of a single actuator which performs both tracking and access operations.

15. A track servo control system for an optical disk apparatus, comprising:
- an objective lens for converging light from a light source onto a track formed on an optical disk, said objective lens being arrangement to be movable;
- error detecting means for detecting a difference in position between the light converged by said objective lens and said track on said optical disk;
- amplifying means for amplifying an output signal of said error detecting means, an amplification factor of said amplifying means being arranged to be changeable;
- moving means for moving said objective lens in accordance with said output signal of said error detecting means so that the difference in position between said converged light and said track is reduced;
- storage means for storing amplification factors corresponding to distances between said objective lens and a rotational center of said optical disk whereby the difference in position between the converged light and said track is optimally reduced;
- detecting means for detecting a distance of said objective lens from said rotational center of said optical disk;
- control means for reading an amplification factor from said storage means on the basis of said distance of said objective lens detected by said detecting means so as to change said amplification factor of said amplifying means to the read amplification factor.

16. A track servo control system as claimed in claim 15, wherein said moving means performs a tracking operation and an access operation through a single actuator.

17. A track servo control system for an optical disk apparatus, comprising:
- an objective lens for converging light from a light source onto a track formed on an optical disk, said objective lens being arranged to be movable;
- error detecting means for detecting a difference in position between the light converged by said objective lens and said track on said optical disk;
- variable gain means having a gain for amplification of an output signal of said error detecting means, said gain being variable;
- moving means for moving said objective lens in accordance with said output signal of said error detecting means amplified by said variable gain means, so that the difference in position between the converged light and said track is reduced;
- storage means for storing gains for said variable gain means corresponding to distances of said objective lens from a rotational center of said optical disk whereby the difference in position between the converged light and said track is optically reduced; and
- detecting means for detecting a distance of said objective lens from said rotational center of said optical disk; and
- gain control means for reading said gain for said variable gain means from said storage means on the basis of the distance of said objective lens detected by said detecting means to change said gain of said variable gain means to the read gain.

18. A track servo control system as claimed in claim 17, wherein said moving means performs a tracking operation and an access operation through a single actuator.

19. A track servo control system for an optical disk apparatus, comprising:
- an objective lens for converging light from a light source onto a track formed on an optical disk, said objective lens being arranged to be movable;
- error detecting means for detecting a difference in position between the light converged by said objective lens and said track on said optical disk;
- filter means having a frequency region to pass an output signal of said error detecting means, said frequency region being changeable;
- moving means for moving said objective lens in accordance with said output signal of said error detecting means, which passes through said filter means, so that the difference in position between the converged light and said track is reduced;
- storage means for storing frequency regions corresponding to distances of said objective lens from a rotational center of said optical disk whereby the difference in position between the converged light and said track is optimally reduced;
- detecting means for detecting the distance of said objective means from said rotational center of said optical disk; and
- filter control means for reading from said storage means a frequency region corresponding to the current distance of said objective lens detected by said detecting means to change said frequency region of said filter means to the read frequency region.

20. A track servo control system as claimed in claim 19, wherein said moving means performs a tracking operation and an access operation through a single actuator.

21. A track servo control system for an optical disk apparatus, comprising:
- an objective lens for converging light from a light source onto a track formed on an optical disk, said objective lens being arranged to be movable;
- error detecting means for detecting a difference in position between the light converged by said objective lens and said track on said optical disk;
- offset superimposing means for superimposing an offset value on an output signal of said error detecting means;
- moving means for moving said objective lens in accordance with said output signal of said error detecting means, on which said offset value is superimposed by said offset superimposing means, so that the difference in position between the converged light and said track is reduced;
- storage means for storing offset values corresponding to distance of said objective lens from a rotational center of said optical disk wherein the difference between the converged light and said track is optically reduced;

detecting means for detecting the distance of said objective lens from said optical disk rotational center; and offset control means for reading the offset value from said storage means on the basis of the distance of said objective lens detected by said detecting means so as to change said offset value of said offset superimposing means to the read offset value.

22. A track servo control system as claimed in claim 21, wherein said moving means performs a tracking operations and an access operation through a single actuator.

23. A track servo control system for an optical disk apparatus, comprising:

an objective lens for converging light from a light source on a track formed on an optical disk, said objective lens being arranged to be movable;

error detecting means for detecting a difference in position between the light converged by said objective lens and said track on said optical disk;

amplifier means having an amplification factor for an amplification of an output signal of said error detecting means, said amplification factor being variable;

moving means for moving said objective lens in accordance with said output signal of said error detecting means, which is amplified by said amplifier means, so that the difference in position between the converged light and said track is reduced;

storage means for storing amplification factors for said amplifying means in accordance with addresses of tracks of said optical disk, whereby the difference between the converged light and said track is optimally reduced;

address detecting means for reading the address of said track to be illuminated with the light converged by said objective lens; and control means for reading an amplification factor from said storage means on the basis of the address of said track read by said address detecting means so as to change said amplification factor of said amplifier means to the read amplification factor.

24. A track servo control system as claimed in claim 23, wherein said moving means performs a tracking operation and an access operation through a single actuator.

25. A track servo control system for an optical disk apparatus, comprising:

an objective lens for converging light from a light source onto a track formed on an optical disk, said objective lens being arranged to be movable;

error detecting means for detecting a difference between the light converged by said objective lens and said track on said optical disk;

variable gain means having a gain for amplification of an output signal of said error detecting means, said gain being variable;

moving means for moving said objective lens in accordance with said output signal of said error detecting means, which is amplified by said variable gain means, so that the difference between the converged light and said track is reduced;

storage means for storing gains for said variable gain means on the basis of addresses of tracks of said optical disk to be illuminated with the light converged by said objective lens, the stored gains allowing the differences between the converged light and said tracks to be optimally reduced;

address detecting means for reading the address of said track to be illuminated with the converged light due to said objective lens; and gain control means for reading the gain corresponding to the track address, read by said address detecting means, from said storage means so as to change said gain of said variable gain means to the read gain.

26. A track servo control system as claimed in claim 25, wherein said moving means performs a tracking operation and an access operation through a single actuator.

* * * * *